June 24, 1958 H. J. SHAFER 2,840,104
PRESSURE RELIEF VALVE
Filed Aug. 3, 1953 2 Sheets-Sheet 1
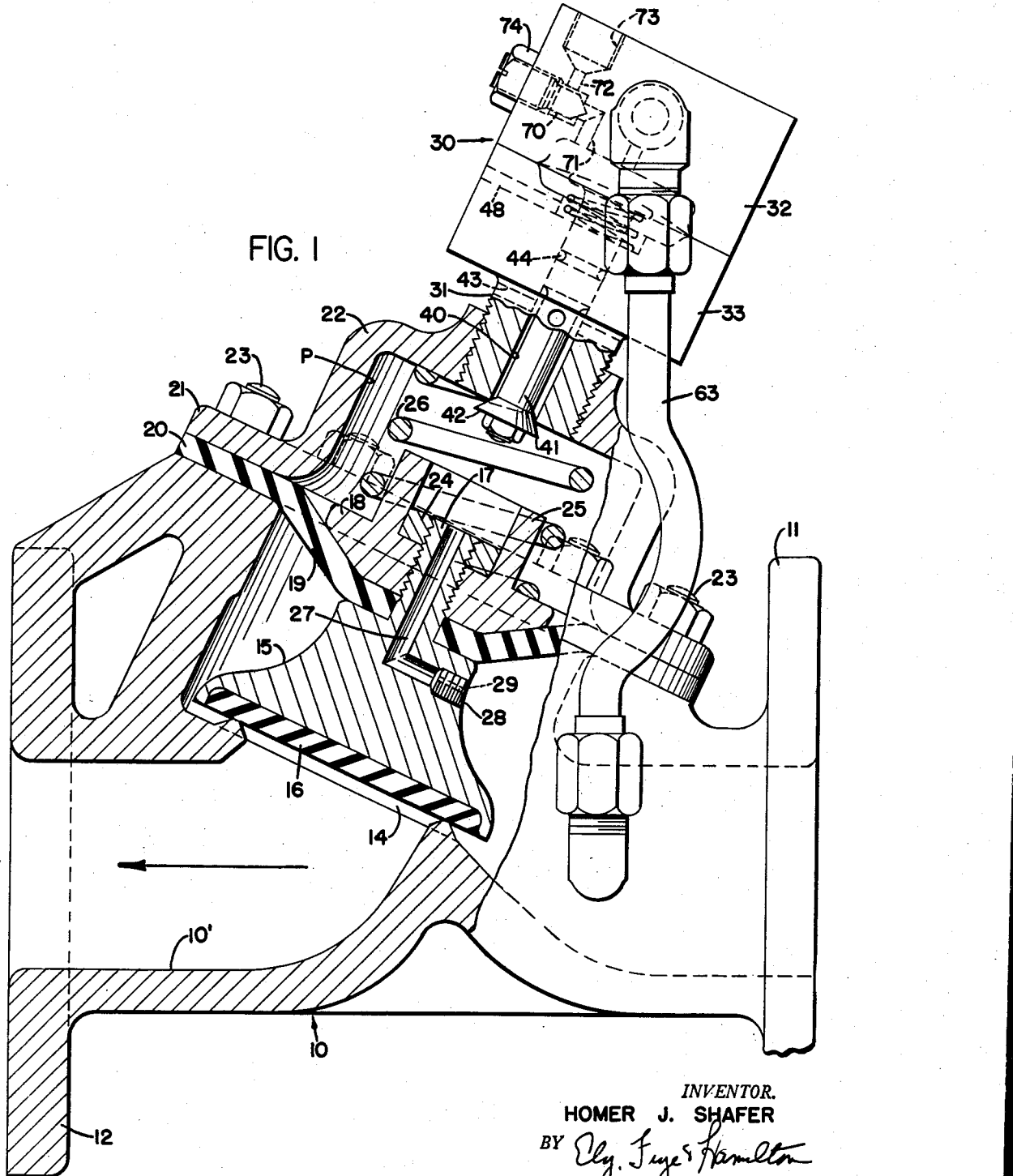
FIG. I
INVENTOR.
HOMER J. SHAFER
BY
ATTYS.

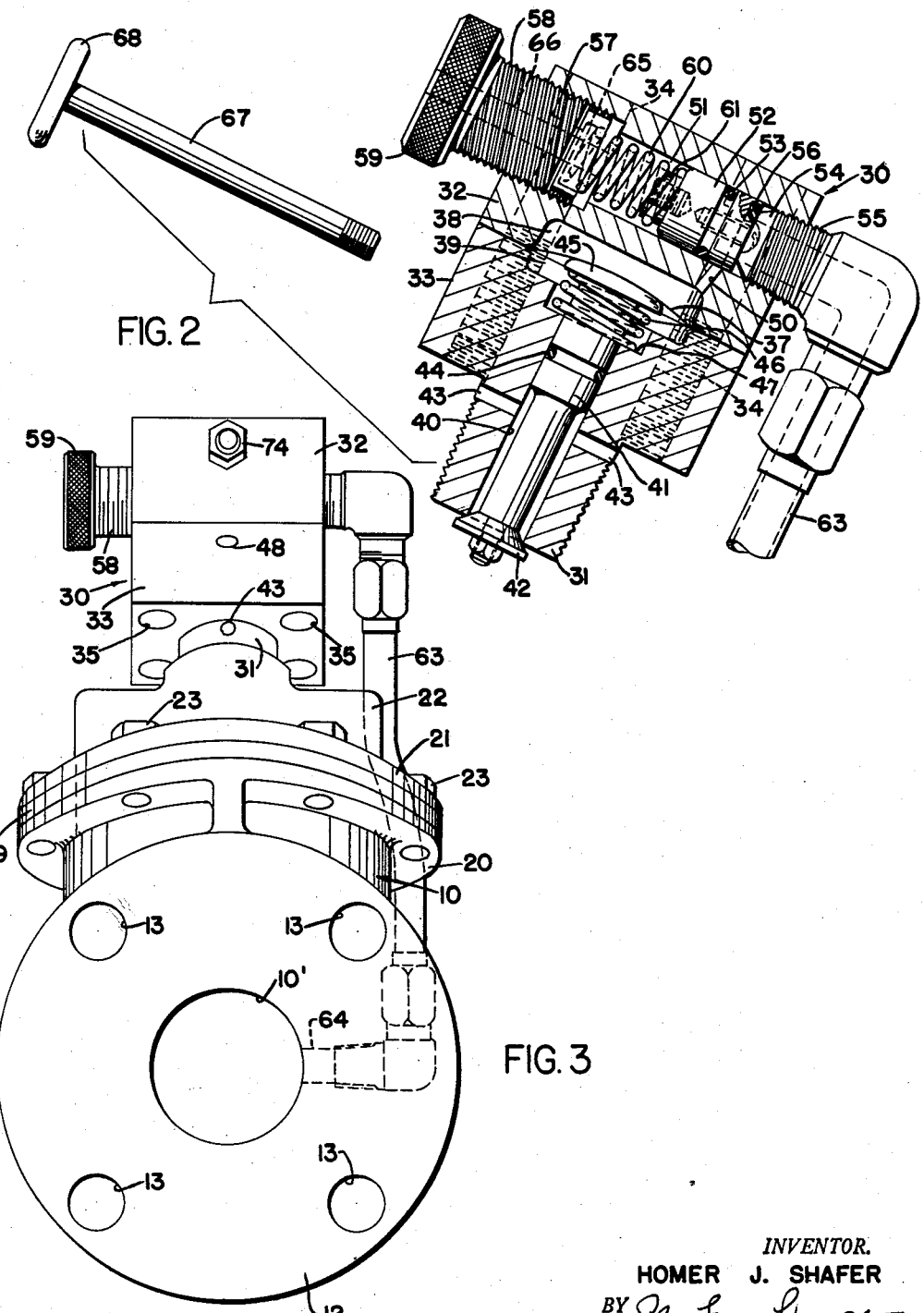

United States Patent Office
2,840,104
Patented June 24, 1958

2,840,104

PRESSURE RELIEF VALVE

Homer J. Shafer, Mansfield, Ohio, assignor to Shafer Valve Company, Mansfield, Ohio, a corporation of Ohio Application August 3, 1953, Serial No. 372,042

2 Claims. (Cl. 137—491)

The invention relates to an improved relief valve for use in pressure fluid systems to relieve the presssure in a line when it reaches a predetermined amount or blow-off pressure for which the valve may be adjusted.

Prior pressure relief valves of which I am aware have had numerous disadvantages in respect to construction and operation, and the objects of the present invention include the provision of an improved valve which will overcome those disadvantages, and which constitutes a compact, quick-acting, relief valve which acts with substantially no strain on its parts, yet holds a positive seal when closed. My improved valve has a double pilot valve arrangement which operates with a snap action to open the main valve, and which causes a slight lag in the closing movement of the main valve so as to insure proper operation under all conditions. Other objects will appear in the course of the following detailed description.

The objects of the invention are accomplished by the improved construction which is shown by way of example in the accompanying drawings and described in the specification. Various modifications and changes in details of construction may be made within the scope of the claims appended hereto.

Referring to the drawings:

Fig. 1 is a vertical sectional view of the improved relief valve with parts in elevation;

Fig. 2 is a vertical sectional view of the top portion of the valve taken at right angles to Fig. 1; and Fig. 3 is an end elevation of the valve on a reduced scale.

The valve body 10 is provided at its ends with the usual attaching flanges 11 and 12 having bolt holes 13 therein for attaching the valve to similar flanges in a pipe line carrying fluid under high pressure. The flange 11 is at the inlet end and the flange 12 at the outlet end so that flow through the valve channel 10' is in the direction of the arrow in Fig. 1. The annular valve seat 14 is inclined to the direction of flow and its lower side is within the channel or course 10' of the pipe line, so that the course of the pressure fluid changes very little in passing through the valve. This is an important factor in many installations because it causes less friction and pressure loss than in many other types of valves, such as a conventional globe valve. As shown, the seat 14 may be beveled or crowned to present a relatively sharp seating surface to the main valve 15, and the surface which rests on the seat is preferably a sturdy gasket 16 of rubber or rubber-like material bonded to the metal of valve 15.

The valve 15 is preferably bell-shaped and has an externally threaded stem 17 projecting from its upper end which is screwed through a member 18 which mounts the valve on the central portion of a flexible diaphragm 19 preferably of rubber or rubber-like material. The outer marginal portion of the diaphragm is clamped between an annular inclined face 20 of the valve body and a flange 21 of the dome-shaped cap 22 by means of bolts 23. The face 20 and flange 21 are inclined to be parallel with the valve seat 14, and a pressure chamber P is formed within the cap by the diaphragm 19.

The stem 17 has a lock nut 24 screwed on its upper end and a spring-centering flange 25 surrounds the lock nut. A coil spring 26 is interposed between the member 18 and the top of the cap 22, and the lower end of the spring fits around the centering flange 25. The spring 26 urges the diaphragm to flex downwardly and seat the valve 15 on its seat 14, as shown in Fig. 1.

The valve chamber on the underside of the diaphragm is in communication with the pressure side of the valve at all times, and the pressure chamber P on the upper side of the diaphragm communicates with the valve chamber through an L-shaped passageway 27 which extends axially through the stem 17 and laterally out through valve 15. A plug 28 is screwed in the lateral portion of the passageway 27 and has a restricted orifice 29 for metering the flow of pressure fluid therethrough.

When the pressure chamber P is closed, as in Fig. 1, the passage 27 allows the pressure on both sides of the diaphragm 19 to become substantially balanced, so that there is substantially no strain on the diaphragm when the valve is closed. When the valve is open and chamber P is closed, the valve is moved to closing position by spring 26, and is held closed by the pressure in the line, aided by the spring.

A pilot valve housing indicated generally at 30 is mounted on top of the cap 22, preferably by screwing the externally threaded neck 31 of the housing into the top of the cap. Preferably, the housing 30 includes an upper block 32 clamped to a lower block 33 by cap screws 34 screwed in tapped holes 35 in the lower block. The meeting faces of the upper and lower blocks 32 and 33 are recessed at their central portions to form a chamber, and a diaphragm 37 traverses the chamber and has its marginal portions clamped between the blocks by the cap screws 34. The diaphragm divides the chamber into an upper portion 38 and a lower portion 39.

A passageway 40 extends axially through the lower block 33 and provides communication between chamber 39 and the pressure chamber P within cap 32. A pilot valve stem 41 is slidably mounted in passageway 40, and has a valve head 42 on its lower end for seating on the lower end of the passageway and closing it off. The lower portion of the stem 41 is reduced in diameter to form an annular passage around the stem and lateral ports 43 connect this passage with the atmosphere at the upper part of the neck 31.

The upper portion of the pilot valve stem 41 has a close sliding fit with passageway 40, and an O-ring 44 is located in a groove around the stem to make a seal between the stem and passageway. The top of the stem has an enlarged rounded disk portion 45 abutting the diaphragm 37, and a spring 46 is interposed between the disk and an annular shoulder 47 around the stem for urging the stem upwardly against the diaphragm and normally hold the valve head 42 in closed position.

The chamber 39 below diaphragm 36 communicates with the atmosphere through a lateral port 48, and the chamber 38 above the diaphragm is connected by a port 50 to an upper pilot valve passageway 51 extending transversely through the upper block 32. A pilot valve plug 52 is slidably mounted within passageway 51 and has an O-ring seal 53 in a groove around its exterior. The valve plug 52 normally abuts the beveled or crowned annular seat 54 on the end of a pipe nipple 55 screwed in the end of passageway 51, and in this position the plug 52 closes off port 50, as shown in Fig. 2. Preferably the seat 54 abuts a rubber insert 56 in the valve plug.

At its opposite end the passageway 51 is enlarged and internally threaded, as shown at 57, and a pilot valve adjusting screw 58 is screwed therein. The outer end 59 of the screw 58 is knurled for turning with the fingers and its inner end is provided with a spring seating socket for receiving one end of a compression spring 60, the other end of which abuts a shoulder formed on the valve plug 52 around a spring centering boss 61. The compressive force of spring 60 holds the plug tightly against the seat 54 of nipple 55, and the nipple is connected by a pipe line 63 to a port 64 communicating with the pressure side of the valve body 10. Thus by adjusting the screw 58 the force of the spring may be set to allow the pilot valve 52 to open at any desired pressure in the pressure side of the valve body 10. Preferably, a loosely mounted rigid washer 65 engages the end of spring 60 in the socket in the inner end of screw 58, so that when the screw 59 is turned to adjust the amount of compression, there will be no torsional stress applied to the spring.

As shown in Fig. 2, the boss 61 of the pilot valve plug 52 is internally threaded and the screw 58 has an axial bore 66 aligned therewith. A pull stem 67 having a flanged outer end 68 and a threaded inner end is adapted to be inserted through the bore 66 and screwed into the plug for pulling outwardly thereon to open the valve for testing purposes.

Referring to Fig. 1, the chamber 38 above the upper diaphragm is connected to the atmosphere through an orifice which is adjustably restricted to gradually bleed pressure fluid from the chamber. A tapered valve 70 screwed into the block provides the adjustable restriction between the port 71 connected to chamber 38 and port 72 leading to the atmosphere through an enlarged tapped hole 73. A lock nut 74 may be screwed onto the valve screw 70.

In the operation of the improved valve, assuming the main valve 15 is closed and the pressure on both sides of the diaphragm 19 to be balanced with the spring 26 aiding in holding the valve on its seat 14, the pilot valve spring 60 is set to require a predetermined amount of pressure to open pilot valve 52. When the pressure on the pressure side of the main valve and hence in the line 63 exceeds the predetermined amount, the pilot valve plug 52 will begin to move away from its seat 54 which is of smaller area than the end of the plug. This immediately allows the pressure to become effective over the entire area of the end of the valve plug causing it to snap open past the port 50. Pressure fluid immediately rushes into chamber 38 much more rapidly than it can escape past bleed valve 70, flexing the diaphragm downward against the action of spring 46 to snap the valve head 42 open against the pressure in chamber P because of the much greater area of the diaphragm 37 exposed to the pressure in chamber 38 as compared with the area of head 42 exposed to the pressure in chamber P. This allows pressure fluid from the pressure chamber P above diaphragm 19 to rush out of the ports 43 and escape into the atmosphere, reducing the pressure on the upper side of the diaphragm much more rapidly than it can build up through restricted orifice 29, and causing the pressure on the underside of diaphragm 19 to open the main valve. The valve 15 will remain open as long as the lower pilot valve is open allowing pressure fluid to exhaust through ports 43.

When the pressure in line 63 drops below the predetermined amount necessary to overcome the force of spring 60, the spring will return the valve plug 52 to closed position closing off port 50, and the pressure in chamber 38 will become atmospheric due to bleeding past valve 70. The pressure in chamber 39 is atmospheric due to the open port 48 connected therewith, so that after a slight delay the spring 46 will close the lower pilot valve and flex the diaphragm 37 upwardly. Once the valve 42 is shut, pressure fluid from the line will pass through orifice 29 and build up in the chamber P until the pressure on both sides of the diaphragm 19 is balanced, when the force of spring 26 will flex the diaphragm 19 downwardly and close the valve. The lag in closing the main valve after the upper pilot closes prevents repeated operation of the main valve which might otherwise be caused by rapid fluctuations in line pressure.

The snap opening action of the upper pilot causes substantially snap action of the lower pilot so that the main valve is opened almost instantaneously when the pressure in the line exceeds the predetermined amount, and the area of the main diaphragm is approximately twice that of the main valve so that its action is positive. Due to the balance of pressure on both sides of the diaphragm the valve is moved toward closing position by the action of the spring 26 so that there is a minimum of strain on the diaphragm and consequent long life thereof.

What is claimed is:

1. In a pilot valve assembly including upper and lower mating blocks forming a chamber therebetween and means clamping a diaphragm traversing said chamber and forming upper and lower parts between the blocks, a first pilot valve in the lower block having an element extending into the lower part of said chamber, a spring urging said element against the diaphragm normally to hold said valve closed, said upper block having a transverse passageway, a conduit connecting one end of said passageway with a source of pressure, a port connecting the side of said passageway to the upper part of said chamber, a bleeder connecting said upper chamber part with the atmosphere, a second pilot valve axially movable in said passageway normally closing off said conduit and said side port and adapted when fully opened to uncover said port, said conduit having a valve seat of substantially less area than said second pilot valve to cause a snap opening of the valve to fully open position, and adjustable spring means normally holding said second pilot valve closed.

2. In a pilot valve assembly including mating housing parts forming a chamber and means clamping a diaphragm between said parts traversing said chamber and forming a pair of chamber sides, a first pilot valve in one housing part having an element extending into one side of said chamber, a spring urging said element against said diaphragm normally to hold said valve closed, the other housing part having a tranverse passageway, a conduit connecting one end of said passageway with a source of pressure, a port connecting the passageway between its ends with the other side of said chamber, a bleeder valve connecting said other side of said chamber with the atmosphere, a second pilot valve axially movable in said passageway normally seating against said conduit and closing said port and adapted when fully opened to uncover said port, the seating area of said conduit being substantially less than the area of said second pilot valve to cause a snap opening of the valve to fully open position, and adjustable spring means normally holding said second pilot valve closed.

References Cited in the file of this patent

UNITED STATES PATENTS

| | | |
|---|---|---|
| 591,014 | Schreidt | Oct. 5, 1897 |
| 934,083 | Mills | Sept. 14, 1909 |
| 1,056,562 | Lombard | Mar. 18, 1913 |
| 1,527,275 | Ruths | Feb. 24, 1925 |
| 1,767,702 | Ruckstuhl | June 24, 1925 |
| 2,223,044 | Miller | Nov. 26, 1940 |
| 2,239,657 | Stadlin | Apr. 22, 1941 |
| 2,351,871 | Parker | June 20, 1944 |
| 2,387,225 | Beekley | Oct. 23, 1945 |
| 2,487,418 | Birkemeier | Nov. 8, 1949 |
| 2,504,057 | Trefil | Apr. 11, 1950 |
| 2,576,516 | Jurs | Nov. 27, 1951 |
| 2,665,105 | Svabeck | Jan. 5, 1954 |

FOREIGN PATENTS

| | | |
|---|---|---|
| 548,796 | Great Britain | Oct. 26, 1942 |